(12) United States Patent
Bevington

(10) Patent No.: US 6,413,053 B1
(45) Date of Patent: Jul. 2, 2002

(54) APPARATUS AND METHOD FOR MOVING FLUID

(75) Inventor: Jack Bevington, Ashland, OH (US)

(73) Assignee: F.E. Meyers, Ashland, OH (US)

( * ) Notice: Subject to any disclaimer, the term of this patent is extended or adjusted under 35 U.S.C. 154(b) by 0 days.

(21) Appl. No.: 09/498,425

(22) Filed: Feb. 4, 2000

(51) Int. Cl.$^7$ .................................................. F04F 1/06

(52) U.S. Cl. .......................... 417/54; 417/120; 417/138

(58) Field of Search .............................. 417/46, 53, 54, 417/120, 138; 166/68.5

(56) References Cited

U.S. PATENT DOCUMENTS

| | | | | |
|---|---|---|---|---|
| 4,025,235 A | * | 5/1977 | Newbrough | 417/54 |
| 6,048,175 A | * | 8/2000 | Corlew et al. | 417/120 |
| 6,146,104 A | * | 11/2000 | Mastroianni et al. | 417/54 |

FOREIGN PATENT DOCUMENTS

| | | |
|---|---|---|
| DE | 1242516 | 6/1967 |
| DE | 19530060 | 2/1997 |
| GB | 1586630 | 3/1978 |

* cited by examiner

Primary Examiner—Charles G. Freay
(74) Attorney, Agent, or Firm—Emerson & Skeriotts; Roger D. Emerson; Timothy D. Bennett

(57) ABSTRACT

A method of supplying water from a well is provided. The method includes the following steps. First, a supply apparatus is provided that includes a container having first and second ends and a first chamber extending to a first opening in the second end. The supply apparatus also has a first fluid conduit with a first branch for use in transporting the water from the first chamber. Next, at least a portion of the second end of the container is submerged within the water in the well such that the first chamber contains a quantity of air. Then, at least a portion of the quantity of air from the first chamber is removed by an air compressor thereby drawing a vacuum within the first chamber. The vacuum in turn draws a quantity of water from the well into the first chamber through the first opening. Next, the removal of air from the first chamber is stopped when the water has obtained a first predetermined level within the first chamber. The first opening is then closed. Compressed air is supplied to the first chamber from the air compressor above the first predetermined level of water thereby forcing at least a portion of the quantity of water out of the first chamber and through the first branch of the first fluid conduit. Finally, the supply of compressed air to the first chamber is stopped when the water has obtained a second predetermined level within the first chamber. In another embodiment the container has two chambers permitting continuous supply of water.

19 Claims, 2 Drawing Sheets

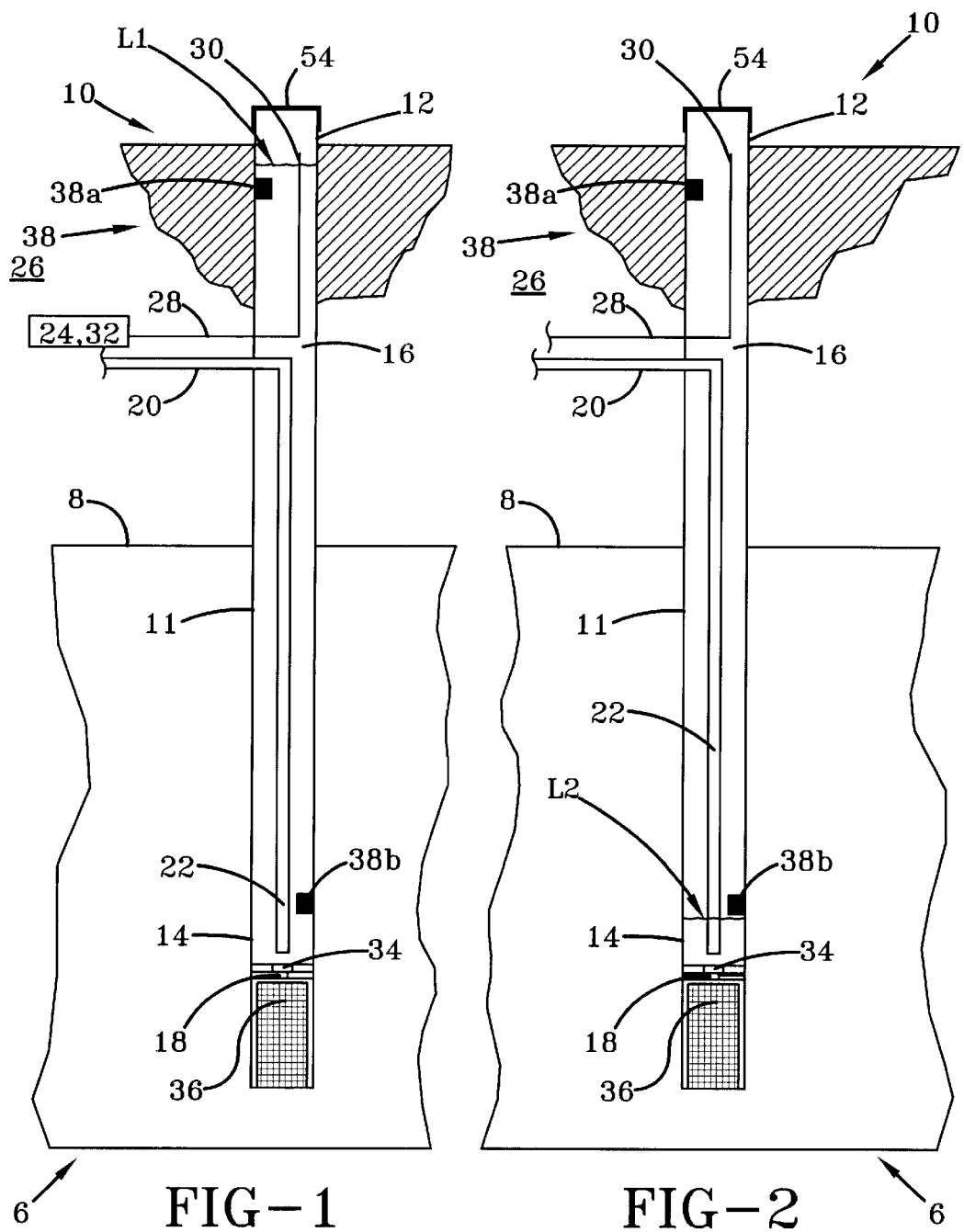

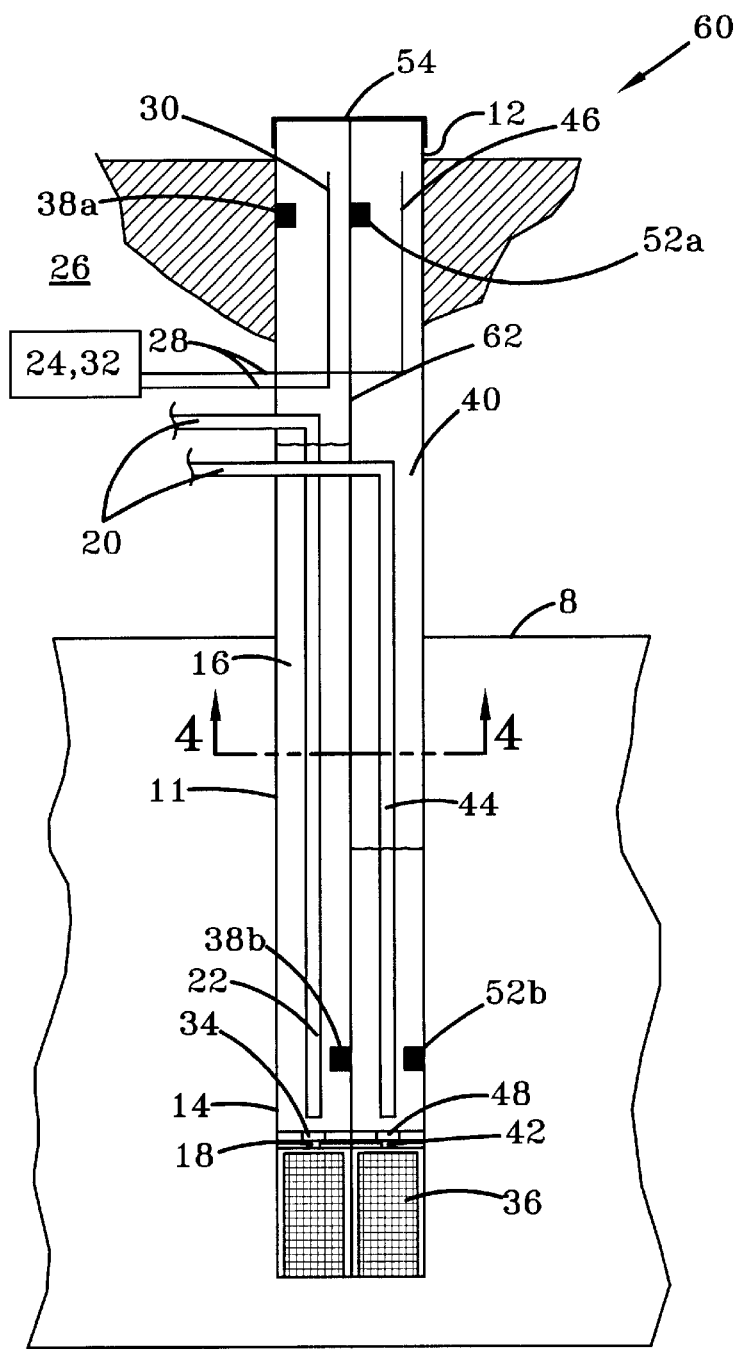
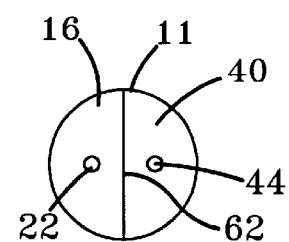
FIG-3
FIG-4

APPARATUS AND METHOD FOR MOVING FLUID

BACKGROUND OF THE INVENTION

1. Field of Invention

This invention pertains to the art of moving fluids and more specifically to methods and apparatuses for supplying water from an underground well.

2. Description of the Related Art

Methods and apparatuses for obtaining water from underground wells are generally known within the related art. In rural circumstances water is typically drawn from a well by way of a pump and supplied to a pressurized tank near the occupant's home. When the occupant turns on the water (typically by opening a faucet) water is delivered from the tank. When the pressure within the tank drops below a predetermined level the pump provides additional water to the tank for use by the home occupants. In other words, the pump operates to re-pressurize the system. Such pumps are known to experience wear especially if sand or other such material should enter into the pump with the water.

The present invention eliminates the need for a separate pressurized tank and the typical water pump. The difficulties in the art are therefore overcome in a way that is simple and efficient, while providing better and more advantageous results.

SUMMARY OF THE INVENTION

According to one aspect of this invention, a method of supplying water from a well is provided. The method includes the following steps. First, a supply apparatus is provided that includes a container having first and second ends and a first chamber extending to a first opening in the second end. The supply apparatus also has a first fluid conduit with a first branch for use in transporting the water from the first chamber. Next, at least a portion of the second end of the container is submerged within the water in the well such that the first chamber contains a quantity of air. Then, at least a portion of the quantity of air from the first chamber is removed thereby drawing a vacuum within the first chamber. The vacuum in turn draws a quantity of water from the well into the first chamber through the first opening. Next, the removal of air from the first chamber is stopped when the water has obtained a first predetermined level within the first chamber. The first opening is then closed. Additional air is supplied to the first chamber above the first predetermined level of water thereby forcing at least a portion of the quantity of water out of the first chamber and through the first branch of the first fluid conduit. Finally, the supply of additional air to the first chamber is stopped when the water has obtained a second predetermined level within the first chamber.

According to another aspect of this invention, a supply apparatus for use in supplying a first fluid is provided. The supply apparatus includes a container having first and second ends and a first chamber extending to a first opening in the second end. The second end of the container is submerged within a well of the first fluid. The supply apparatus also includes a first fluid conduit having a first branch for use in transporting the first fluid from the first chamber in the container, a second fluid supply means for selectively supplying a second fluid to the first chamber, a second fluid removal means for selectively removing the second fluid from the first chamber, and a second fluid conduit having a first branch for use in transporting the second fluid from the second fluid supply means to the first chamber in the container. Preferably, the second fluid supply means and the second fluid removal means are both supplied by a single air compressor or air pump.

According to still another aspect of this invention, the container also has a second chamber extending to a second opening in the second end and the first fluid conduit has a second branch for use in transporting the first fluid from the second chamber in the container. The second fluid supply means also selectively supplies the second fluid to the second chamber and the second fluid removal means also selectively removes the second fluid from the second chamber. The second fluid conduit has a second branch for use in transporting the second fluid from the second fluid supply means to the second chamber in the container.

One advantage of the present invention is that the typical water pump and pressurized tank used in known systems are not required.

Another advantage of the present invention is that an air pump or air compressor replaces the typical pump. This minimizes wear due to sand or other such material.

Another advantage of the present invention is that the two chamber embodiment provides for continual supply of water or other fluid.

Another advantage of the present invention is that it is easy and inexpensive to assemble.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 1 is a sectional elevation view of the supply apparatus of this invention showing the water at a first predetermined level within the chamber of the container.

FIG. 2 is a sectional elevation view of the supply apparatus of this invention similar to FIG. 1 except showing the water at a second predetermined level within the chamber of the container.

FIG. 3 is a sectional elevation view of another embodiment of this invention showing a supply apparatus having first and second chambers within the container.

FIG. 4 is a sectional view taken along the line 4—4 of FIG. 3 showing the wall that separates the container into first and second chambers.

DESCRIPTION OF THE PREFERRED EMBODIMENT

Referring now to the drawings wherein the showings are for purposes of illustrating a preferred embodiment of the invention only and not for purposes of limiting the same, FIG. 1 shows the present invention, a supply apparatus 10 positioned such that it is partially submerged within a first fluid 8 located in a well 6. In the preferred embodiments shown in the FIGS., the first fluid 8 is water, the well 6 refers to an underground water supply, and a later to be described second fluid 26 is air. However, this invention is applicable with any well or pool of any first fluid 8 and any second fluid 26 chosen with sound engineering judgment.

With reference to FIGS. 1 and 2, the supply apparatus 10 includes a container 11 having first and second ends 12, 14 respectively. Within the container 11 a chamber 16 extends to a first opening 18 in the second end 14. Preferably, a removable cap 54 seals the chamber 16 at the first end 12. The cap 54 must provide a substantially airtight seal but is preferably removable to provide access into the chamber 16. The container 11 can be shaped as required and formed of any material chosen with sound engineering judgment. However, in the preferred embodiment the container 11 is a cylindrically shaped tube having an inside diameter between 4.0 and 12.0 inches. This provides the required capacity for most rural homes. Preferably the container 11 is formed of poly vinyl chloride (PVC) pipe. This provides for an airtight, light structure that will not rust. When an underground well 6 is the source of the first liquid 8, the container 11 is placed within the ground such that the second end 14 of the container 11 is submerged within the first fluid 8. As will become inherent from the description herein, the container 11 serves as the storage tank to store the fluid. The container 11 is supported in any manner known in the art.

With continuing reference to FIGS. 1 and 2, the supply apparatus 10 also includes a first fluid conduit 20 that is used to transport the first fluid 8 from the chamber 16 to an occupant's home or for other use (not shown). A second fluid conduit 28 is used to transport a second fluid 26, from a second fluid supply means 24 to the chamber 16 and to transport the second fluid from the chamber 16 to a second fluid removal means 32. In other words, the second fluid supply means 24 is used to selectively provide the second fluid 26 to the chamber 16 and the second fluid removal means 32 is used to selectively remove the second fluid 26 from the chamber 16. Both means 24, 32 are shown in representative form in the FIGS. In the preferred embodiment the second fluid 26 is air and the second fluid supply means 24 and the second fluid removal means 32 are together a single air pump or air compressor. Thus, the second fluid supply means 24 provides compressed air (air that may have a pressure above atmospheric pressure) to the chamber 16 and the second fluid removal means 32 draws a vacuum (air that may have a pressure less than atmospheric pressure) within the chamber 16. The air pump or compressor may be located as desired.

With continuing reference to FIGS. 1 and 2, preferably a first branch 22 of the first fluid conduit 20 extends downward toward the second end 14 of the container 11 and a first branch 30, of the second fluid conduit 28 extends upward toward the first end 12 of the container 11. This positioning of the branches 22, 30 optimizes the operating range of the supply apparatus 10 as will become clear below. It is also preferred that a check valve 34 be operatively mounted to the first opening 18 at the second end 14 of the container 11. The check valve 34 is positioned and used, as is commonly known in the art, to permit the first fluid 8 to enter the first opening 18 but also to prevent the first fluid 8 from exiting the first opening 18. A screen 36 may be used to screen or filter the first fluid 8 prior to its entry into the chamber 16. Preferably, the screen 36 is connected to the second end 14 of the container 11 as shown.

Still referring to FIGS. 1–2, the supply apparatus 10 preferably also includes a chamber level detecting means 38 for use in detecting the level of the first fluid 8 within the chamber 16. Most preferably, the detecting means 38 includes a first level switch 38a mounted at the first end 12 of the container 11 near the end of the first branch 30 and a second level switch 38b mounted at the second end 12 of the container 11 near the end of the first branch 22. Both level switches 38a, 38b are used to determine the level of the first liquid 8 within the chamber 16 and then send a corresponding signal to the air compressor 24, 32. This will be discussed further below. Applicant notes that the general operation of such level switches is well known in the art.

With continuing reference to FIGS. 1 and 2, the operation of the supply apparatus 10 when water from an underground well 6 is supplied to a home (not shown) will now be discussed. This embodiment further includes that water is the first fluid 8, air is the second fluid 26 and a single air compressor is both the second fluid supply means 24 and the second fluid removal means 32. Of course the supply apparatus 10 can be used with other first and second fluids 8, 26 and other supply and removal means 24, 32 chosen with sound engineering judgment. As shown, at least a portion of the second end 14 of the container 11 is submerged within the water 8 in the well 6. This ensures that the first opening 18 is also submerged within the water 8. It is important that some quantity of air 26 remain within the chamber 16. This air 26 will naturally remain above any water 8 that may enter the chamber 16 as the container 11 is placed into the well 6. By naturally it is meant that, as is well known in the art, air is less dense than water and thus gravitational forces will cause any water within the chamber 16 to remain below any air. Once the container 11 is properly positioned and secured within the well 6, the operation of the supply apparatus 10 may be considered as occurring in two stages—a filling stage and a supply stage. During the filling stage the container 11 is filled with the water 8 from the well 6. During the supply stage the water 8 is supplied, as required, to the corresponding home or other such user.

With continuing referral to FIGS. 1 and 2, first the filling stage will be described. At least a portion of the quantity of air 26 within the chamber 16 is removed by activating the air compressor 32 and removing the air through the second fluid conduit 28 thereby drawing a vacuum within the chamber 16. The vacuum will then draw a quantity of water 6 from the well 6 into the chamber 16 through the first opening 18. Air 26 is continually drawn out of the chamber 16 (maintaining or increasing the vacuum pressure) until the water 6 reaches a first predetermined level L1 within the chamber 16 as detected by the first level switch 38a. Preferably, the first predetermined level L1 is established to be a safe distance below the end of the first branch 30. If the water level rose above the end of the first branch 30, water would be drawn through the first branch 30 and into the air compressor. This is obviously undesirable. Once the water 8 reaches the first predetermined level L1, the first level switch 38a will switch thereby sending a signal (preferably an electric signal) to the air compressor 32 to de-activate the air compressor 32 thereby stopping the removal of air 26. This will prevent the water level within the chamber 16 from increasing further. The first check valve 34 prevents the water 8 within the chamber 16 from returning to the well 6 through the first opening 18. At this point the filling stage is complete. This is the condition shown in FIG. 1. Applicants contemplate that this filling stage may occur during the night when the demand for water is minimal in the typical home.

Still referring to FIGS. 1 and 2, the supply stage will now be described. When water is required within the home, separate controls (not shown) signal the air compressor 24, 32 that water 8 is required. These separate controls may be of any type chosen with sound engineering judgment and may sense the pressure reduction in the water supply piping when, for example, a faucet (not shown) is opened. The air compressor 24 then supplies compressed air 26 to the chamber 16 through the second fluid conduit 28. This additional air 26 increases the air pressure within the top of the chamber 16. The air pressure forces the water 8 within the container 11 to exit the chamber 16 through the first fluid conduit 20 and flow to the occupant's home water system (not shown). It should be remembered that the check valve 34 prevents the water 8 from exiting through the first opening 18. Thus, the level of water within the chamber 16 is lowered as water is provided to the home. When the demand for water is satisfied, the air compressor is signaled to stop supplying compressed air to the chamber 16. This will stop the supply of water as the pressures within the chamber 16 will equalize and water flow will be prevented. When the demand for water re-occurs, the air compressor 24 is again signaled to supply compressed air and water 8 is again provided as described. The water 8 within the chamber 16 can be supplied as required until the water level within the chamber 16 reaches a second predetermined level L2 as measured by the second level switch 38b. Preferably, the second predetermined level L2 is established to be a safe distance above the end of the first branch 22. If the water level dropped below the end of the first branch 22, air would be introduced into the water system. This is obviously undesirable. For any given inside diameter of the container 11 (and thus the diameter of the chamber 16), the greater the distance between the first predetermined level L1 and the second predetermined level L2 the greater the volume of water (or other first fluid) that can be filled into the container 11. Thus, the distance between the first and second predetermined levels L1, L2 helps define the operational range of the supply apparatus 10. Once the water 8 reaches the second predetermined level L2, the second level switch 38b will switch thereby sending a signal (preferably an electric signal) to the air compressor 32 to de-activate the air compressor 32 thereby stopping the supply of compressed air 26. This will stop the supply of water. At this point the supply stage is complete. This is the condition shown in FIG. 2. To refill the supply apparatus 10, it is only necessary to operate under the filling stage as described above.

FIGS. 3–4 show another embodiment of this invention, a second supply apparatus 60 where a container 11 has first and second chambers 16, 40. In operation this embodiment may function similar to two of the previously described supply apparatuses 10 running offset. By running offset it is meant that typically while the first chamber 16 is operating in the filling stage, the second chamber 40 is operating in the supply stage. Similarly, when the second chamber 40 is operating in the filling stage, the first chamber 16 is typically operating in the supply stage. In this way water (or any other first fluid 8) can be supplied continuously as the demand requires.

With reference then to FIGS. 3–4, the second supply apparatus 60 includes a container 11 having first and second ends 12, 14 respectively. Within the container 11 first and second chambers 16, 40 are separated by a wall 62. As shown, the wall 62 evenly divides the container 11 such that the first and second chambers 16, 40 are of the same size. Of course the wall 62 may be positioned within the container such that the chambers 16, 40 have different sizes. The chambers 16, 40 extend to first and second openings 18, 42 respectively in the second end 14. Again it is preferred that a removable cap 54 seals the chambers 16, 40 at the first end 12 and that the container 11 is a cylindrically shaped tube.

With continuing reference to FIGS. 3–4, the supply apparatus 60 includes two first fluid conduits 20, 20 that are used to transport the first fluid 8, water in this embodiment, from the chambers 16, 40 to an occupant's home or for other use (not shown). Two second fluid conduits 28, 28 are used to transport a second fluid 26 from a second fluid supply means 24 to the chambers 16, 40 and to transport the second fluid from the chambers 16, 40 to a second fluid removal means 32. As above, it is preferred that the second fluid 26 is air and the second fluid supply means 24 and the second fluid removal means 32 are together a single air pump or air compressor. Also as above, preferably first branches 22, 44 of the first fluid conduits 20, 20 extend downward toward the second end 14 of the container 11 and first branches 30, 46 of the second fluid conduits 28, 28 extend upward toward the first end 12 of the container 11. First and second check valves 34, 48 are used to permit the water 8 to enter the first and second openings 18, 42 respectively but also to prevent the first fluid 8 from exiting the first and second openings 18, 42. A screen 36 may be used to screen or filter the first fluid 8 prior to its entry into the chambers 16, 40.

Referring now to FIG. 3, the supply apparatus 60 preferably also includes first and second chamber level detecting means 38, 52 for use in detecting the level of the first fluid 8 within the first and second chambers 16, 40 respectively. Most preferably, the first and second detecting means 38, 52 each include a first level switch 38a, 52a mounted at the first end 12 of the container 11 near the ends of the first and second branches 30, 46 and a second level switch 38b, 52b mounted at the second end 12 of the container 11 near the ends of the first and second branches 22, 44. All the level switches 38a, 38b, 52a, 52b are used to determine the level of the first liquid 8 within the chambers 16, 40 and then to send a corresponding signal to the air compressor 24, 32.

The operation of the supply apparatus 60, shown in FIG. 3, is quite similar to the operation of the previously described supply apparatus 10. Again the operation of the supply apparatus 60 may be considered as occurring in two stages a filling stage and a supply stage. However, in this case the filling and supply stages may occur in offset as described above. It should be noted, however, that it is not a requirement that the first and second chambers 16, 40 operate in offset. It is also contemplated that both chambers may be in the filling stage or the supply stage simultaneously.

With continuing reference to FIG. 3, the air compressor 32 is used to removing the air through the appropriate second fluid conduit 28 or 28 thereby drawing a vacuum within the corresponding chamber 16 or 40 as required. This vacuum in turn draws a quantity of water 6 from the well 6 into either the first or second chamber 16, 40 as required. Air 26 is continually drawn until the water 6 reaches a first predetermined level within the corresponding chamber 16 or 40. Once the water 8 reaches the first predetermined level, the appropriate level switch 38a or 52a will switch thereby sending a signal to the air compressor 32 to deactivate the air compressor 32 thereby stopping the removal of air 26. This will prevent the water level within the chamber 16 or 40 from increasing further. The first and second check valves 34, 48 prevent the water 8 from returning to the well 6. Again this describes the filling stage.

Still referring to FIG. 3, when water is required, separate controls (not shown) signal the air compressor 24, 32 to supply compressed air 26 to the appropriate chamber 16, or 40. The air pressure forces the water 8 within the container 11 to exit the corresponding chamber 16 or 40 and flow to the occupant's home water system (not shown). When the demand for water is satisfied, the air compressor is signaled to stop supplying compressed air to the chamber 16, or 40. This will stop the supply of water. When the demand for water re-occurs, the air compressor 24 is again signaled to supply compressed air and water 8 is again provided as described. The water 8 can be supplied as required until the water level within the appropriate chamber 16 or 40 reaches a second predetermined level. Once the water 8 reaches the second predetermined level, the air compressor 32 is signaled to de-activate the air compressor 32 thereby stopping the supply of compressed air 26. This will stop the supply of water. As should be evident from this description, the supply apparatus 60 provides for a continuous supply of water or other first fluid 8.

While the invention has been described in connection with specific embodiments and applications, no intention to restrict the invention to the examples shown is contemplated. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A method of supplying water from a well comprising the steps of:
    providing a supply apparatus that includes a container having first and second ends and a first chamber extending to a first opening in the second end, the supply apparatus also having a first fluid conduit with a first branch for use in transporting the water from the first chamber and a second fluid conduit with a first branch for use in transporting air to the first chamber, the container adapted to be a storage tank;
    submerging at least a portion of the second end of the container within the water in the well such that the first chamber contains a quantity of air;
    removing at least a portion of the quantity of air from the first chamber through the first branch of the second fluid conduit thereby drawing a vacuum within the first chamber;
    drawing a quantity of water from the well into the first chamber through the first opening;
    stopping the removal of air from the first chamber when the water has obtained a first predetermined level within the first chamber;
    closing the first opening;
    storing the water in the container;
    supplying additional air to the first chamber above the first predetermined level of water thereby forcing at least a portion of the quantity of water out of the first chamber and through the first branch of the first fluid conduit; and,
    stopping the supply of additional air to the first chamber when the water has obtained a second predetermined level within the first chamber.

2. The method of claim 1 further comprising the steps of:
    providing the container with a second chamber extending to a second opening in the second end, the first fluid conduit including a second branch for use in transporting the water from the second chamber, the second fluid conduit including a second branch for use in transporting air to the second chamber, the second chamber containing a quantity of air;
    before the step of stopping the supply of additional air to the first chamber when the water has obtained a second predetermined level within the first chamber, the method comprising the steps of,
        removing at least a portion of the quantity of air from the second chamber through the second branch of the second fluid conduit thereby drawing a vacuum within the second chamber;
        drawing a quantity of water from the well into the second chamber through the second opening;
        stopping the removal of air from the second chamber when the water has obtained a first predetermined level within the second chamber; and,
        closing the second opening.

3. The method of claim 2 wherein after the step of closing the second opening, the method comprises the steps of:
    supplying additional air to the second chamber above the first predetermined level of water thereby forcing at least a portion of the quantity of water out of the second chamber and through the second branch of the first fluid conduit; and,
    stopping the supply of additional air to the second chamber when the water has obtained a second predetermined level within the second chamber.

4. The method of claim 3 wherein,
    the step of drawing a quantity of water from the well into the first chamber through the first opening, includes the step of filtering the water prior to its entry into the first chamber; and,
    the step of drawing a quantity of water from the well into the second chamber through the second opening, includes the step of filtering the water prior to its entry into the second chamber.

5. A supply apparatus for use in supplying a first fluid, the supply apparatus comprising:
    a container having first and second ends and a first chamber extending to a first opening in said second end, said second end of said container being submergible within a well of said first fluid, said container adapted to be a storage tank to store said first fluid;
    a first fluid conduit having a first branch for use in transporting said first fluid from said first chamber in said container;
    second fluid supply means for selectively supplying a second fluid to said first chamber;
    second fluid removal means for selectively removing said second fluid from said first chamber; and,
    a second fluid conduit having a first branch for use in transporting said second fluid from said second fluid supply means to said first chamber in said container.

6. The supply apparatus of claim 5 wherein,
    said first branch of said first fluid conduit communicates with said first chamber at said second end of said container; and,
    said first branch of said second fluid conduit communicates with said first chamber at said first end of said container.

7. The supply apparatus of claim 6 further comprising:
    a first check valve for use in permitting said first fluid to enter said first opening and for use in preventing said first fluid from exiting said first opening, said first check valve being operatively mounted to said second end of said container; and,
    a first screen for use in screening said first fluid prior to its entry into said first chamber through said first opening, said first screen being operatively connected to said second end of said container.

8. The supply apparatus of claim 7 further comprising:
    first chamber level detecting means for use in detecting first and second levels of said first fluid within said first chamber of said container.

9. The supply apparatus of claim 8 wherein said second fluid is air and an air compressor provides said second fluid supply means and said second fluid removal means.

10. The supply apparatus of claim 8 wherein,
said container has a second chamber extending to a second opening in said second end;
said first fluid conduit has a second branch for use in transporting said first fluid from said second chamber in said container;
said second fluid supply means also selectively supplies said second fluid to said second chamber;
said second fluid removal means also selectively removes said second fluid from said second chamber; and,
said second fluid conduit has a second branch for use in transporting said second fluid from said second fluid supply means to said second chamber in said container.

11. The supply apparatus of claim 10 further comprising:
a second check valve for use in permitting said first fluid to enter said second opening and for use in preventing said first fluid from exiting said second opening, said second check valve being operatively mounted to said second end of said container; and,
a second screen for use in screening said first fluid prior to its entry into said second chamber through said second opening, said second screen being operatively connected to said second end of said container.

12. The supply apparatus of claim 11 further comprising:
second chamber level detecting means for use in detecting first and second levels of said first fluid within said second chamber of said container.

13. A supply apparatus for use in supplying a first fluid, the apparatus comprising:
a container having first and second ends and a first chamber extending to a first opening in said second end, said second end of said container being submergible within a well of said first fluid, said container being formed of a poly vinyl chloride (PVC) pipe having an outside diameter between 4.0 and 12.0 inches;
a first fluid conduit having a first branch for use in transporting said firs fluid from said first chamber in said container;
second fluid supply means for selectively supplying a second fluid to said first chamber;
second fluid removal means for selectively removing said second fluid from said first chamber; and,
a second fluid conduit having a first branch for use in transporting said second fluid from said second fluid supply means to said first chamber in said container.

14. A method of supplying a first fluid comprising the steps of:
providing a supply apparatus that includes a container having first and second ends and a first chamber extending to a first opening in said second end, the supply apparatus also having a first fluid conduit with a first branch for use in transporting the first fluid from the first chamber and a second fluid conduit with a first branch for use in transporting a second fluid to the first chamber, said container having an outsider diameter between 4.0 and 12.0 inches;
submerging at least a portion of the second end of the container within a pool of the first fluid such that the first chamber contains a quantity of second fluid;
removing at least a portion of said quantity of second fluid from the first chamber through the first branch of the second fluid conduit thereby drawing a quantity of first fluid into the first chamber through the first opening; and,
supplying additional second fluid to the first chamber thereby forcing at least a portion of said quantity of first fluid out of said first chamber and through the first branch of the first fluid conduit.

15. The method of claim 14 wherein after the step of removing at least a portion of said quantity of second fluid from the first chamber thereby drawing a quantity of first fluid into the first chamber through the first opening, the method further comprises the step of:
stopping the removal of said second fluid from the first chamber when said first fluid has obtained a first predetermined level within the first chamber.

16. The method of claim 15 wherein after the step of stopping the removal of said second fluid from the first chamber when said first fluid has obtained a first predetermined level within the first chamber, the method comprises the step of:
closing the first opening.

17. The method of claim 14 further comprising the steps of:
providing the container with a second chamber extending to a second opening in the second end, the second chamber containing a quantity of said second fluid;
the step of supplying additional second fluid to the first chamber thereby forcing at least a portion of said quantity of said first fluid out of said first chamber and through the first fluid conduit, comprising the step of,
removing at least a portion of said quantity of second fluid from the second chamber thereby drawing a quantity of first fluid into the second chamber through the second opening.

18. The method of claim 17 wherein after the step of removing at least a portion of said quantity of second fluid from the second chamber thereby drawing a quantity of first fluid into the second chamber through the second opening, the method further comprises the steps of:
stopping the removal of said second fluid from the second chamber when the first fluid has obtained a first predetermined level within the second chamber; and,
closing the second opening.

19. The method of claim 18 further comprising the steps of:
providing the first fluid conduit with a second branch for use in transporting first fluid from the second chamber;
after the step of closing the second opening, the method further comprising the step of,
supplying additional second fluid to the second chamber thereby forcing at least a portion of said quantity of first fluid out of said second chamber and through the second branch of the first fluid conduit.

* * * * *